(12) United States Patent
Takaku et al.

(10) Patent No.: US 7,770,679 B2
(45) Date of Patent: Aug. 10, 2010

(54) INSTALLATION STRUCTURE OF RELEASE PIPE IN FUEL CELL VEHICLE AND FUEL GAS VEHICLE

(75) Inventors: Koichi Takaku, Saitama (JP); Shuichi Togasawa, Saitama (JP); Kentaro Miura, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 973 days.

(21) Appl. No.: 10/584,999

(22) PCT Filed: Nov. 29, 2005

(86) PCT No.: PCT/JP2005/021886
§ 371 (c)(1),
(2), (4) Date: Jun. 29, 2006

(87) PCT Pub. No.: WO2006/059599
PCT Pub. Date: Jun. 8, 2006

(65) Prior Publication Data
US 2009/0025989 A1 Jan. 29, 2009

(30) Foreign Application Priority Data
Nov. 30, 2004 (JP) .............................. 2004-347911

(51) Int. Cl.
B60L 11/00 (2006.01)
(52) U.S. Cl. ...................... 180/68.5; 180/69.4; 903/908
(58) Field of Classification Search ................. 180/68.5, 180/65.1; 903/944
See application file for complete search history.

(56) References Cited

U.S. PATENT DOCUMENTS 5,193,635 A * 3/1993 Mizuno et al. ........... 180/65.25

(Continued)

FOREIGN PATENT DOCUMENTS

JP 2002-206696 7/2002

(Continued)

OTHER PUBLICATIONS

Notice of Reasons for Refusal issued by the Japan Patent Office dated Feb. 6, 2009 corresponding to Japanese Laid-Open Patent Appln No. 2004-347911.

(Continued)

*Primary Examiner*—Jeffrey J Restifo
(74) *Attorney, Agent, or Firm*—Kratz, Quintos & Hanson, LLP

(57) ABSTRACT

A release outlet (52) of a release pipe (51) of a relief valve (50) is provided in the vicinity of an exhaust outlet (170) of a fuel cell box (39) in a space between a sub-frame (22) and the fuel cell box (39). A ventilating inlet (130) is formed on a front wall (120) of the fuel cell box (39). A fan (180) can send outside air into the fuel cell box (39). A ventilation flow of the outside air which is sent into the fuel cell box (39) passes through and ventilates the fuel cell box (39) so as to cool a fuel cell stack (38). Exhaust air is exhausted rearward from the exhaust outlet (170) of an exhaust duct (160). The release pipe (51) and the release outlet (52) are heated by the exhaust air. Therefore, heating the release pipe (51) and the release outlet (52) can prevent the release outlet (52) from being blocked by snow or ice.

8 Claims, 5 Drawing Sheets

U.S. PATENT DOCUMENTS

| | | | |
|---|---|---|---|
| 5,284,267 A | 2/1994 | Polletta et al. | 220/4.14 |
| 5,392,873 A * | 2/1995 | Masuyama et al. | 180/68.5 |
| 5,490,572 A * | 2/1996 | Tajiri et al. | 180/65.1 |
| 5,641,031 A * | 6/1997 | Riemer et al. | 429/13 |
| 5,673,939 A * | 10/1997 | Bees et al. | 280/831 |
| 5,730,237 A * | 3/1998 | Matsuki et al. | 180/65.1 |
| 6,378,637 B1 * | 4/2002 | Ono et al. | 180/65.31 |
| 6,481,751 B1 | 11/2002 | Davis, Jr. et al. | 280/831 |
| 6,648,085 B2 * | 11/2003 | Nagura et al. | 180/65.1 |
| 6,672,620 B2 * | 1/2004 | Kawazu et al. | 280/834 |
| 6,715,571 B2 * | 4/2004 | Nakamori | 180/65.1 |
| 6,874,588 B2 * | 4/2005 | Kato et al. | 429/13 |
| 6,953,099 B2 * | 10/2005 | Kawasaki et al. | 180/65.1 |
| 6,978,855 B2 * | 12/2005 | Kubota et al. | 429/13 |
| 7,040,432 B2 * | 5/2006 | Kawasaki et al. | 180/65.1 |
| 7,086,492 B2 * | 8/2006 | Kawasaki et al. | 180/274 |
| 7,108,027 B2 * | 9/2006 | Horii | 141/311 A |
| 7,108,091 B2 * | 9/2006 | Guidry et al. | 180/68.1 |
| 7,270,202 B2 * | 9/2007 | Kondo | 180/65.1 |
| 7,270,899 B2 * | 9/2007 | Kato et al. | 429/12 |
| 7,281,600 B2 * | 10/2007 | Chernoff et al. | 180/291 |
| 7,303,033 B2 * | 12/2007 | Chernoff et al. | 180/65.8 |
| 7,363,997 B2 * | 4/2008 | Sato et al. | 180/65.31 |
| 7,368,197 B2 * | 5/2008 | Horii et al. | 429/26 |
| 7,374,001 B2 * | 5/2008 | Uozumi et al. | 180/65.31 |

FOREIGN PATENT DOCUMENTS

| | | |
|---|---|---|
| JP | 2004-100583 | 4/2004 |
| JP | 2004-161057 | 6/2004 |
| JP | 2004-204956 | 7/2004 |
| WO | WO 02/053418 A1 | 7/2002 |
| WO | WO 03/104010 A1 | 12/2003 |

OTHER PUBLICATIONS

Supplemental European Search Report of Oct. 2, 2008.

* cited by examiner

FIG. 5
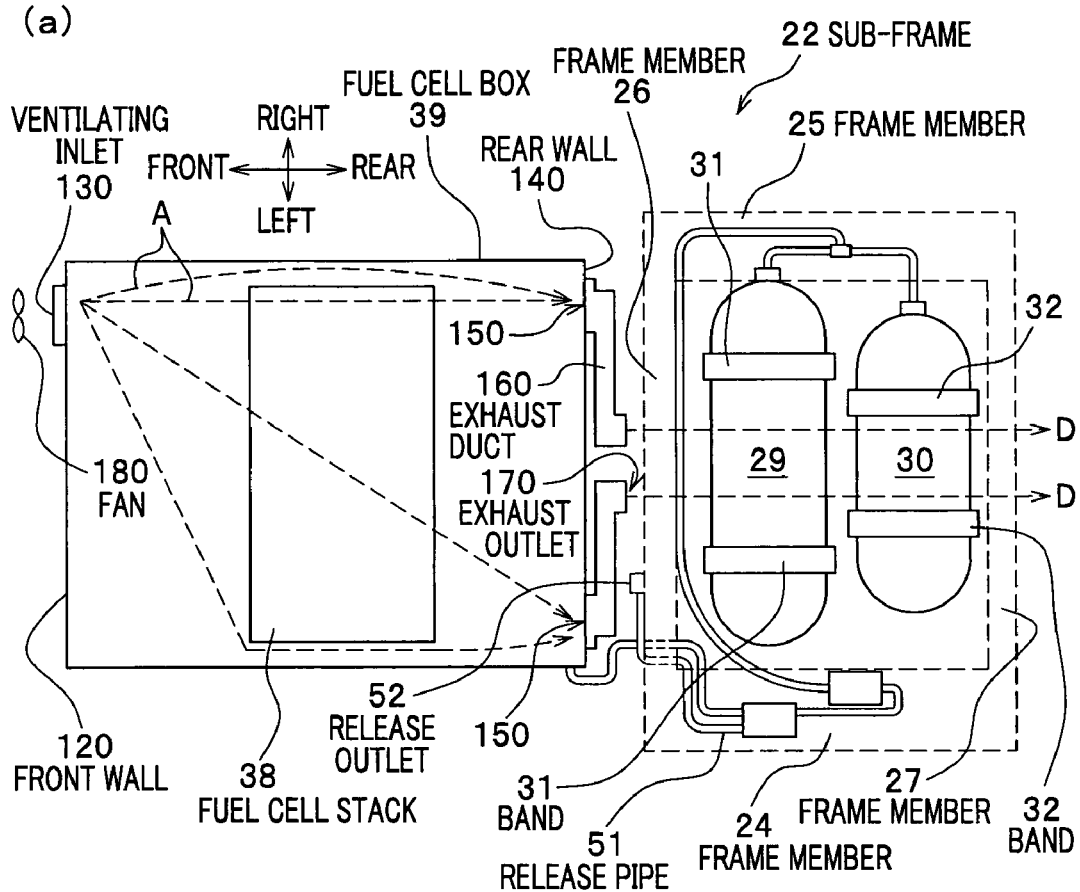
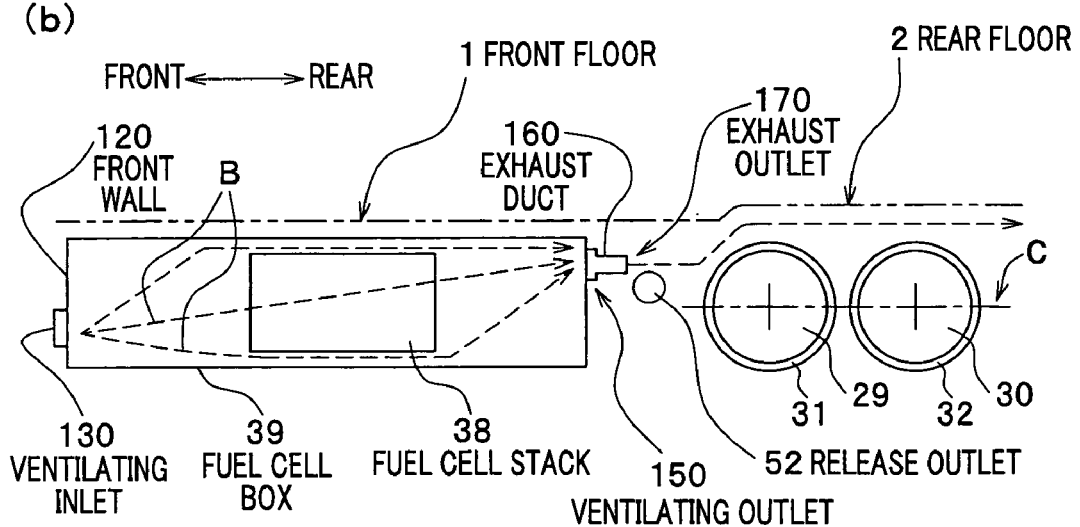

INSTALLATION STRUCTURE OF RELEASE PIPE IN FUEL CELL VEHICLE AND FUEL GAS VEHICLE

TECHNICAL FIELD

The present invention relates to installation structure of a release pipe in a fuel cell vehicle and a fuel gas vehicle.

BACKGROUND ART

In a fuel cell vehicle using high-pressure hydrogen, a safety valve is employed to release hydrogen to reduce pressure of hydrogen when temperature rises in a hydrogen tank where the high-pressure hydrogen is stored (See JP 2002-206696A). The safety valve is provided in the vicinity of the hydrogen tank and sealed by metal having low melting point. Thus, the safety valve does not operate in normal conditions. However, when the metal is melted as the temperature rises in the hydrogen tank, high-pressure gas pushes a plug of the safety valve so as to open the safety valve. As a result, the hydrogen is released to prevent internal pressure inside the hydrogen tank from increasing.

In addition, a hydrogen burst generates large energy due to high pressure of the hydrogen when the hydrogen is released into the air. Therefore, in a well-known technology, a shielding member is provided in a release outlet to disperse the hydrogen so as to reduce outside influence (See JP 2004-204956A).

However, a vehicle is considered to be used under various conditions. For instance, a release outlet of a safety valve may be blocked caused by frozen snow, water, or the like when a fuel cell vehicle is used under low temperature conditions such as snowfalls. Nevertheless, no technology taking these conditions into consideration is disclosed in the conventional technologies described above. Therefore, even though a safety valve is employed, it is predicted that the safety valve does not function depending on position where a release outlet is placed.

In view of the conventional problem described above, it is an object of the present invention to provide installation structure of a release pipe in a fuel cell vehicle and a fuel gas vehicle in order that a safety valve can surely function without a release outlet of the safety valve being blocked even under low temperature conditions.

DISCLOSURE OF THE INVENTION

For this reason, according to the present invention, in a fuel cell vehicle having a hydrogen tank which stores hydrogen as fuel gas and a fuel cell stack which generates electric power using the hydrogen supplied from the hydrogen tank, the fuel cell stack and the hydrogen tank are arranged in order from front to back of the vehicle in such a manner that the fuel cell stack lies ahead of the hydrogen tank between left and right mainframes which extend in a longitudinal direction of the vehicle under a floor of the vehicle. In the fuel cell vehicle, a release pipe is provided to release the fuel gas in abnormal conditions. In addition, at least a release outlet of the release pipe is placed between the left and right mainframes and between the fuel cell stack and the hydrogen tank under the floor.

None of electric wires, other containers, and so on is placed in an area between the left and the right mainframes and between the fuel cell stack and the hydrogen tank under the floor in the fuel cell vehicle. Therefore, the hydrogen is never released toward the electric wires, other containers, or the like. Moreover, this area is an area to which heat generated in the fuel cell stack is easily transferred so that the waste heat of the fuel cell stack can heat the release outlet.

The present invention may further include a fuel cell box which contains at least the fuel cell stack, and a ventilation which ventilates hydrogen inside the fuel cell box. Thus, the ventilation may send ventilation air to rearward of the fuel cell box toward the release outlet.

Accordingly, hydrogen leaked from the fuel cell stack can be also exhausted without being retained inside the fuel cell box. Moreover, the ventilation air can necessarily heat the release outlet.

In the present invention, the release outlet may be placed in a higher position than a center axis of the hydrogen tank.

Thus, when the ventilation sends ventilation air toward above of the center axis of the hydrogen tank, the release outlet can be efficiently heated.

According to the present invention, in a fuel gas vehicle having a gas container which stores fuel gas, and an engine which generates power using the fuel gas supplied from the gas container, a release pipe is provided to release the fuel gas in abnormal conditions. In the fuel gas vehicle, at least a release outlet of the release pipe is placed in an area which is heated by the engine.

Accordingly, heat generated in the engine can heat the release outlet of the release pipe.

According to the present invention, heat generated in a fuel cell stack or an engine can heat a release outlet of a release pipe which releases fuel gas such as hydrogen in abnormal conditions so as to prevent the release outlet from being frozen and blocked caused by frozen snow, water, or the like.

BRIEF DESCRIPTION OF THE DRAWINGS

FIG. 5 is a diagram showing the position where the release pipe of the relief valve is placed, as well as a ventilation structure in a fuel cell box.

BEST MODE FOR CARRYING OUT THE INVENTION

Here will be described an embodiment in a case where the present invention is applied to a fuel cell vehicle, below.

Figure 1:
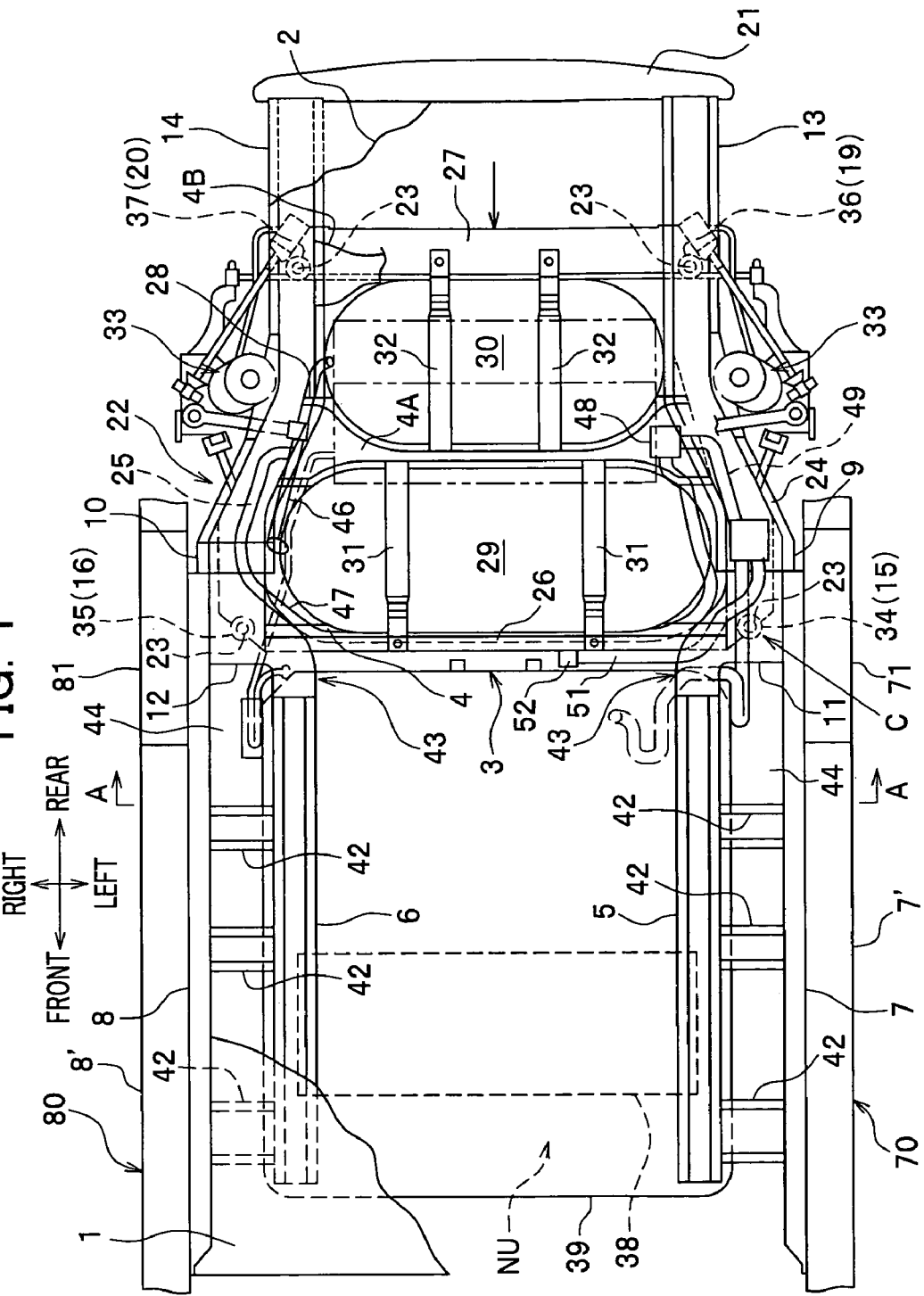
FIG. 1 is a top plan view showing installation structure of a fuel cell stack system in a fuel cell vehicle.
Figure 2:
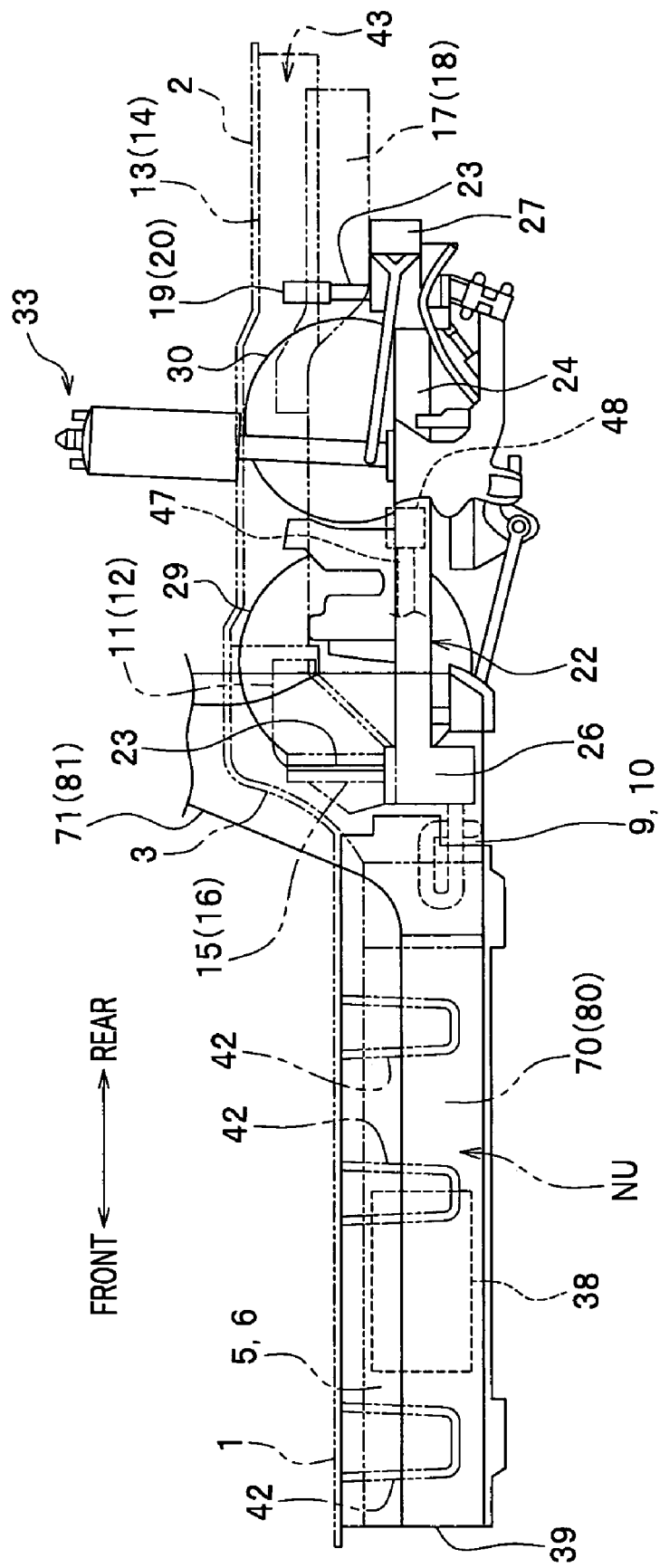
FIG. 2 is a side view of FIG. 1.
Figure 3:
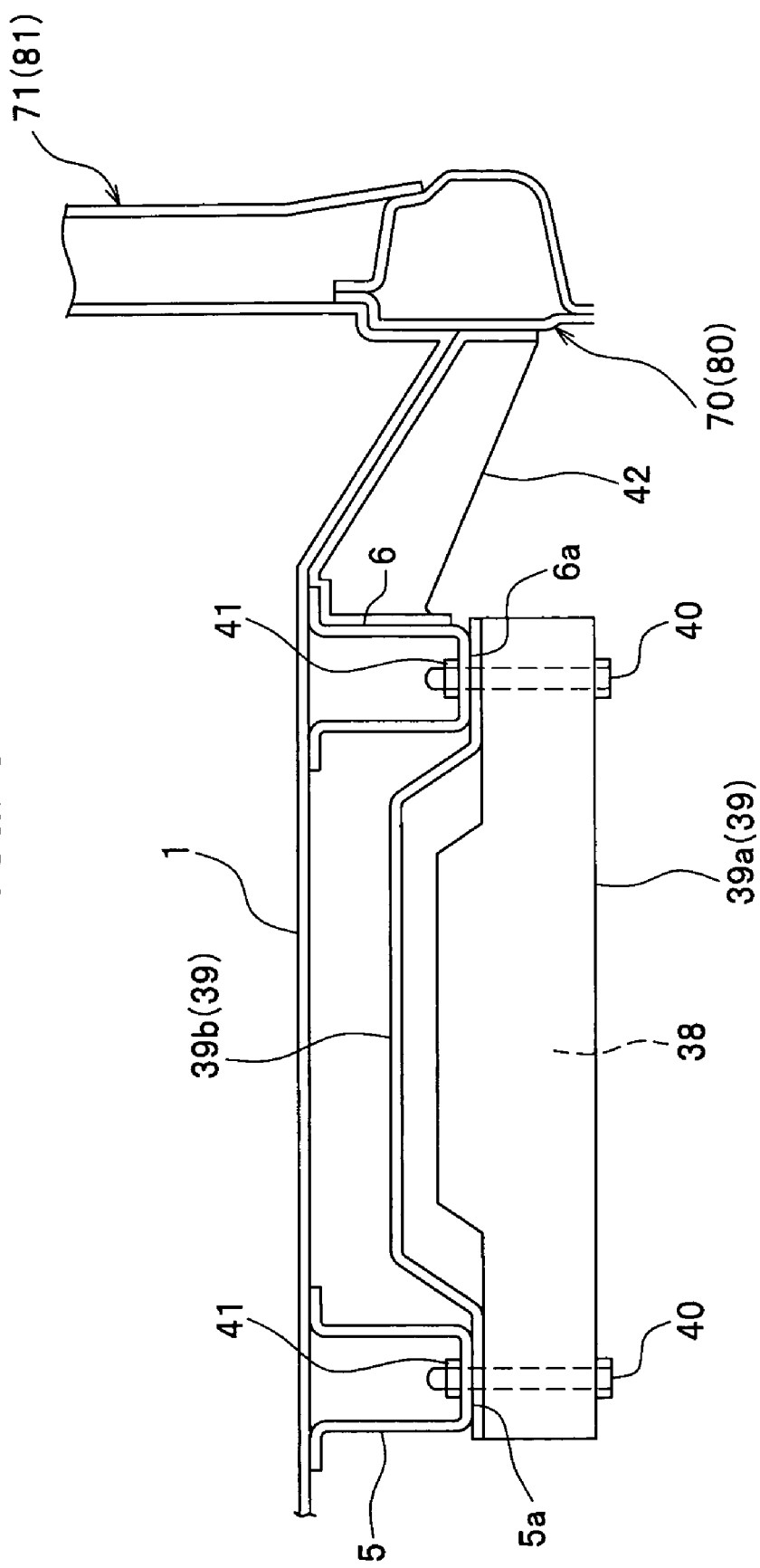
FIG. 3 is an A-A sectional view in FIG. 1.

FIG. 1 is a top plan view showing installation structure of a fuel cell stack system in a fuel cell vehicle. FIG. 2 is a side view of FIG. 1. FIG. 3 is an A-A cross-sectional view in FIG. 1.

In this installation structure, a fuel cell stack and hydrogen tanks are installed in order from front (a forward side) under a floor. As shown in FIGS. 1 and 2, a rear floor 2 which forms a step rising in a rear direction (see FIG. 2) is attached to a rear edge of a front floor 1 to form the floor.

A pair of left and right rear frames 13 and 14 are attached along a longitudinal direction under the rear floor 2. In addition, side sills 70 and 80 which are attached to side edges of the front floor 1 and floor frames 5 and 6 which are placed along the longitudinal direction between the side sills 70 and 80 are connected to front edges of the rear frames 13 and 14 through front brackets 11 and 12 respectively. Thus, a pair of left and right Y-shaped frames 43 and 43 are formed under the floor. Moreover, a cross-member 4 (see FIG. 1) is attached in a reverse side of a step portion 3 of the rear floor 2 across a transverse direction of the vehicle.

Here, mainframes according to the present invention include the rear frames 13 and 14 and the floor frames 5 and 6.

Moreover, inside sills 7 and 8 are respectively connected to the left and right side edges of the front floor 1. Inside sill extensions 9 and 10 are respectively provided at rear ends of the inside sills 7 and 8. In addition, outside sills 7' and 8' (see FIG. 1) are attached to the inside sills 7 and 8 so as to form the side sills 70 and 80.

Rear brackets 17 and 18 whose cross-sections open upward (see FIG. 2) are respectively attached on lower sides of rear ends of the rear frames 13 and 14. Sidewalls of the rear brackets 17 and 18 are attached on outer surfaces of both sidewalls of the rear frames 13 and 14. In addition, color nuts 19 and 20 (see FIG. 2) are vertically provided in front portions of the bottom walls of the rear brackets 17 and 18.

Moreover, two cross-members 4A and 4B are respectively attached in front and back between the left and right rear frames 13 and 14 as shown in FIG. 1. A bumper beam 21 (see FIG. 1) is attached to their rear ends, more specifically, to rear ends of the rear brackets 17 and 18.

In addition, a sub-frame 22 is fixed to color nuts 15, 16, 19, and 20 of the front brackets 11 and 12 and the rear brackets 17 and 18 using bolts 23, 23, 23, and 23 from underneath respectively.

The sub-frame 22 is a substantially rectangular frame member formed of left and right frame members 24 and 25 and front and rear frame members 26 and 27. Moreover, the sub-frame 22 includes a cross beam 28 in the transverse direction of the vehicle. Thus, two hydrogen tanks 29 and 30 are respectively fastened with bands 31 and 32 in spaces divided by the cross beam 28 in order to be fixed to a car body.

The hydrogen tanks 29 and 30 are placed parallel to the transverse direction of the vehicle and positioned at a height to keep a predetermined vertical space between the hydrogen tanks 29 and 30 and the rear floor 2.

Suspension units 33 are attached to the sub-frame 22. And, a tire, which is not shown, is attached to each of the suspension units 33.

In addition, insertion portions 34 and 35 (see FIG. 1) for the bolts 23 and 23 which are inserted into the color nuts 15 and 16 are respectively provided at a corner between a front end of the left frame member 24 and a left end of the front frame member 26 and a corner between a front end of the right frame member 25 and a right end of the front frame member 26. Then, insertion portions 36 and 37 for the bolts 23 and 23 which are inserted into the color nuts 19 and 20 are respectively provided at a corner between a rear end of the left frame member 24 and a left end of the rear frame member 27 and a corner between a rear end of the right frame member 25 and a right end of the rear frame member 27.

Thus, the bolts 23, 23, 23, and 23 are respectively inserted into the insertion portions 34, 35, 36, and 37 of the sub-frame 22 configured in this way. Then, the bolts 23, 23, 23, and 23 are inserted and fastened into the color nuts 15, 16, 19, and 20 which are attached to the front brackets 11 and 12 and the rear brackets 17 and 18 of the rear frames 13 and 14 in order to fix the sub-frame 22 to the floor frames 5 and 6.

A fuel cell box 39 is placed across the left and right floor frames 5 and 6 under the front floor 1. The fuel cell box 39 contains a fuel cell stack unit NU which includes a fuel cell stack 38 and peripheral equipments such as gas pipes. The fuel cell stack 38 generates electric power by electrochemical reaction of hydrogen supplied from the hydrogen tanks 29 and 30 and oxygen in air supplied from a compressor, which is not shown. Then, the fuel cell stack 38 supplies the generated electric power to a drive motor (not shown) placed in a front portion, which is not shown, of the car body to drive the fuel cell vehicle.

As shown in the A-A sectional view in FIG. 3, the fuel cell box 39 includes a main case 39a and a lid 39b which cover the fuel cell stack unit NU. Moreover, the main case 39a and the lid 39b are fixed to bottom walls 5a and 6a of the floor frames 5 and 6 with bolts 40 and 40 being fastened into nuts 41 and 41 from underneath. By the way, a central pillar 71(81) is attached to the side sill 70(80). In addition, a bracket 42 is attached to each of six places on both sides with three places on each side, between the left floor frame 5 and the left side sill 70 and between the right floor frame 6 and the right side sill 80.

Figure 4:
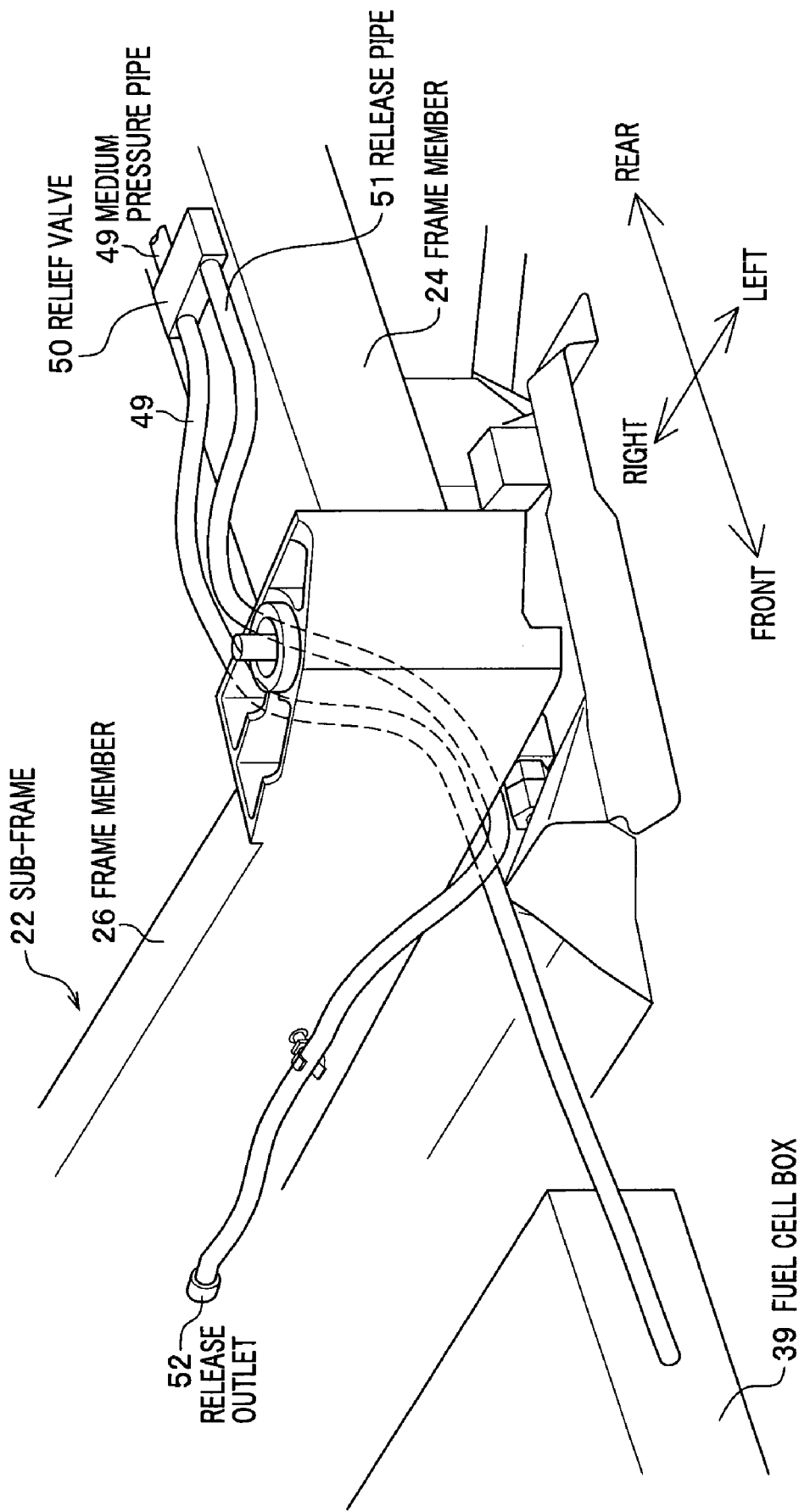
FIG. 4 is a perspective view showing positions where a release pipe and a release outlet are placed according to the present invention.

The hydrogen tanks 29 and 30 are connected by a collection pipe 46 on the right side. A high-pressure pipe 47 which is connected to the collection pipe 46 goes along an inner surface of the frame member 25 of the sub-frame 22 and turns around to front of the front hydrogen tank 29. Then, the high-pressure pipe 47 goes along inner surface of the frame members 26 and 24 so as to be connected to a regulator 48 placed on the left side between both of the hydrogen tanks 29 and 30. Additionally, a medium-pressure pipe 49 which extends forward from the regulator 48 is connected to a relief valve 50 which is attached on the frame member 24 as shown in FIG. 4. A downstream portion of the medium-pressure pipe 49 which is connected to the relief valve 50 goes astride and across both of the sub-frame 22 and the fuel cell box 39 within width of the both. Thus, the downstream portion of the medium-pressure pipe 49 is inserted and arranged in a crotch portion 44 which is a space formed by a left Y-shaped frame 43 on the left side, and then inserted into the fuel cell stack unit NU inside the fuel cell box 39 from a reverse side of a left rear portion of the fuel cell box 39. On the other hand, a release pipe 51 which is connected to the relief valve 50 goes along an outer surface of the frame member 26 which constructs the sub-frame 22, so as to be arranged in a space formed between the fuel cell box 39 and the sub-frame 22.

A ventilation structure which takes in outside air is provided in the fuel cell box 39. Therefore, the fuel cell stack 38 is cooled while the outside air ventilates inside of the fuel cell box 39.

High pressure hydrogen which is stored in the hydrogen tanks 29 and 30 is provided to the fuel cell stack unit NU through the high-pressure pipe 47 and the medium-pressure pipe 49. The regulator 48 decompresses hydrogen in the high-pressure pipe 47 to a predetermined pressure (for instance, 0.5 MPa). At this time, the hydrogen in the high-pressure pipe 47 which has not yet been decompressed enough may be poured into the medium-pressure pipe 49, for instance, caused by malfunction of a valve in the regulator 48. Consequently, the pressure of the hydrogen in the medium-pressure pipe 49 may reach a pressure (for instance, 0.8 MPa) higher than the predetermined pressure. For example, in an abnormal condition where the pressure of the hydrogen in the medium-pressure pipe 49 becomes 2 MPa or higher, the relief valve 50 operates to release the hydrogen through the release pipe 51 and the release outlet 52.

Next, how the release pipe 51 and the release outlet 52 of the relief valve 50 according to the present invention are arranged will be described referring to FIG. 5.

FIG. 5 is a drawing which shows a position where the release pipe of the relief valve is arranged, as well as the ventilation structure in the fuel cell box.

As shown in FIG. 5, a ventilating inlet 130 is provided on a right side in the transverse direction in a front wall 120 of the fuel cell box 39. The ventilating inlet 130 is connected to a fan 180 through an outside air introducing path (not shown). Ventilating outlets 150 and 150 of ventilation air which circulates inside the fuel cell box 39 are provided on both sides in the transverse direction in a rear wall 140 of the fuel cell box 39. In addition, exhaust ducts 160 and 160 are provided outside the rear wall 140 of the fuel cell box 39. The exhaust ducts 160 and 160 which extend inward in the transverse direction are respectively connected to the ventilating outlets 150 and 150. An exhaust outlet 170 which exhausts the ventilation air backward is provided to each of the exhaust ducts 160 in the vicinity of the center in the transverse direction.

As shown in FIG. 5(b), the exhaust outlet 170 of the exhaust duct 160 is provided at a position higher than an axis C of the hydrogen tanks 29 and 30. As shown in FIG. 5(a), the release pipe 51 of the relief valve 50 extends to the vicinity of the exhaust outlet 170 of the exhaust duct 160 along the outer surface of the frame member 26 which faces the rear wall 140 of the fuel cell box 39, so that the release pipe 51 can be heated by hot air exhausted from the exhaust outlet 170. As shown in FIG. 5(b), the release outlet 52 of the release pipe 51 is positioned substantially as high as the exhaust outlet 170, in other words, higher than the axis C of the hydrogen tanks 29 and 30. In addition, as shown in FIG. 4, the release outlet 52 of the release pipe 51 points obliquely downward.

When the fuel cell stack 38 generates electricity, the fan 180 introduces the outside air into the fuel cell box 39 from the ventilating inlet 130 through the outside air introducing path. The outside air forming a ventilation flow flows toward the ventilating outlets 150 and 150 which are provided on the both sides in the rear wall 140 of the fuel cell box 39 as indicated by a dashed arrow A in FIG. 5(a). Therefore, ventilation air circulates as if weaving through spaces on the left and right sides of the fuel cell stack 38. Moreover, the ventilating inlet 130 is positioned lower than the ventilating outlets 150 and 150 in the vertical direction. Thus, the ventilation air also circulates as if weaving through spaces on the upper and lower sides of the fuel cell stack 38 as indicated by a dashed arrow B in FIG. 5(b).

The ventilation air cools the fuel cell stack 38 by heat exchange while ventilating the fuel cell box 39. The ventilation air which has taken heat from the fuel cell stack 38 changes into warm exhaust air to be exhausted backward from the exhaust outlets 170 and 170. The two exhaust outlets 170 and 170 are positioned higher than the axis C of the hydrogen tanks 29 and 30 as shown in FIG. 5(b). Accordingly, the exhaust air from the exhaust outlets 170 and 170 flows toward the upper side of the hydrogen tanks 29 and 30. Therefore, a space between the hydrogen tanks 29 and 30 and the rear floor 2, where hydrogen is apt to be retained, is also ventilated.

The release pipe 51 of the relief valve 50 is heated by radiant heat from the fuel cell box 39 since the release pipe 51 is provided in a space between the fuel cell box 39 and the frame member 26 of the sub-frame 22. In addition, the release pipe 51 is heated by the exhaust air when the exhaust air is exhausted from the exhaust outlets 170 and 170. Therefore, even when the release pipe 51 and the release outlet 52 are blocked by frozen snow or the like under low temperature conditions, starting the fuel cell vehicle generates heat of the fuel cell stack 38 so as to eliminate blocking of the release pipe 51 and the release outlet 52. As a result, it is possible to effectively prevent the relief valve 50 from not functioning caused by snow or ice even when the fuel cell vehicle is used under the low temperature conditions.

Furthermore, even in a case where the fuel cell vehicle whirls up snow while running, the release outlet 52 of the release pipe 51 is heated by the heat of the fuel cell box 39 since the release outlet 52 of the release pipe 51 is provided in the space between the fuel cell box 39 and the frame member 26 of the sub-frame 22 and blocking by snow is unlikely to occur in the space. As a result, it is possible to effectively prevent the release outlet 52 from being blocked by snow or ice.

There are technical standards about usage of hydrogen, which are requested to apply to a fuel cell vehicle. According to the technical standards, for instance, a release outlet of hydrogen is required not to open directly to a passenger cabin or a trunk, not to open to a wheel house, not to face another container, not to face an electric terminal, and not to face forward. According to the present embodiment, it is possible to take an antifreeze measure while complying with the technical standards since the release pipe 51 and the release outlet 52 of the relief valve 50 are placed in the space between the fuel cell box 39 and the frame member 26 of the sub-frame 22.

In other words, a part of the release pipe 51 and the release outlet 52 are placed between the floor frames 5 and 6 and the rear frames 13 and 14 which construct the mainframe, as well as between the fuel cell stack 38 and the hydrogen tanks 29 and 30, under the floor. In addition, none of electric wirings, other containers, and so on is provided under the floor. Therefore, hydrogen is not to be released from the release outlet toward components restricted by the technical standards.

In the above-mentioned embodiment, the release pipe and the release outlet of the relief valve have been described. And, the hydrogen in the hydrogen tanks is urgently released in abnormal conditions, for instance, high temperature in the hydrogen tanks 29 and 30. In a case where an emergency relief valve is employed, a release pipe and a release outlet of the emergency relief valve may be placed similar to the release pipe and the release outlet of the relief valve in the above-mentioned embodiment. As a result, it is possible to take an antifreeze measure similarly while complying with the technical standards.

In the present embodiment, description has been given to the antifreeze measure of the release pipe and the release outlet concerning to the fuel cell vehicle. However, the present embodiment is not limited to this, and is also applicable to a fuel gas vehicle with a hydrogen fueled engine which uses high-pressure hydrogen, for instance. In this case, the fuel cell stack is replaced with the hydrogen fueled engine. In addition, outside air similarly circulates through the hydrogen fueled engine or a cooling mechanism so as to cool heat generated by the hydrogen fueled engine. Then, a release pipe and a release outlet of a relief valve or an emergency relief valve are provided in a passage where the outside air circulates, so as to bring similar effects with those achieved by the present embodiment.

The invention claimed is:

1. An installation structure of a release pipe in a fuel cell vehicle having a hydrogen tank which stores hydrogen as fuel gas and a fuel cell stack which generates electric power using the hydrogen supplied from the hydrogen tank, the fuel cell stack and the hydrogen tank being arranged in order from front to back of the vehicle in such a manner that the fuel cell stack lies ahead of the hydrogen tank between left and right mainframes which extend in a longitudinal direction of the vehicle under a floor of the vehicle, wherein the release pipe is provided to release the fuel gas in abnormal conditions, at least a release outlet of the release pipe is placed between the left and right mainframes and between the fuel cell stack and the hydrogen tank under the floor, the release pipe includes a portion which is supported on a sub-frame which supports the hydrogen tank, the sub-frame being supported on the left and right mainframes, and the supported portion of the release pipe is in a vicinity of the release outlet at which the release outlet is heated by radiant heat from the fuel cell stack and also at which the release pipe is heated by exhaust air from an exhaust outlet of the fuel cell stack.

2. An installation structure of a release pipe in a fuel cell vehicle as claimed in claim 1, further comprising:
a fuel cell box which contains at least the fuel cell stack; and
a ventilation which ventilates hydrogen inside the fuel cell box; wherein the ventilation sends ventilation air to rearward of the fuel cell box toward the release outlet.

3. An installation structure of a release pipe in a fuel cell vehicle as claimed in claim 2, wherein the release outlet is placed in a higher position than a horizontal center axis of the hydrogen tank.

4. An installation structure of a release pipe in a fuel cell vehicle as claimed in claim 1, wherein the release outlet is placed in a higher position than a horizontal center axis of the hydrogen tank.

5. An installation structure of a release pipe in a fuel cell vehicle as claimed in claim 4, wherein the release outlet is placed substantially as high as or below the exhaust outlet.

6. An installation structure of a release pipe in a fuel cell vehicle as claimed in claim 5, wherein exhaust air from the exhaust outlet flows toward the upper side of the hydrogen tank into a space between the hydrogen tanks and the floor.

7. An installation structure of a release pipe in a fuel cell vehicle as claimed in claim 1, wherein the exhaust outlet is in a vicinity of the vehicle center in the transverse direction thereof.

8. An installation structure of a release pipe in a fuel gas vehicle having a gas container which stores fuel gas, and an engine which generates power using the fuel gas supplied from the gas container, wherein the gas container and the engine are arranged under a floor between left and right mainframes of the vehicle, the left and right mainframes extending in a longitudinal direction of the vehicle, the release pipe is provided to release the fuel gas in abnormal conditions, at least a release outlet of the release pipe is placed in an area which is heated by the engine, and the release pipe includes a portion which is supported on a sub-frame which supports the gas container, the sub-frame being supported on the left and right mainframes, and the supported portion of the release pipe is in a vicinity of the release outlet at which the release outlet is heated by radiant heat from the engine and also at which the release pipe is heated by hot air of the engine.

* * * * *